United States Patent
Nagano

[11] Patent Number: 5,920,408
[45] Date of Patent: Jul. 6, 1999

[54] COLOR IMAGE READER

[75] Inventor: Fumikazu Nagano, Yamato-Koriyama, Japan

[73] Assignee: Sharp Kabushiki Kaisha, Osaka, Japan

[21] Appl. No.: 08/775,997

[22] Filed: Jan. 3, 1997

[30] Foreign Application Priority Data

Jan. 18, 1996 [JP] Japan ..................................... 8-006629

[51] Int. Cl.⁶ .............................. H04N 1/46; H04N 1/40; H01R 33/00
[52] U.S. Cl. .......................... 358/509; 358/509; 358/471; 358/516; 362/226
[58] Field of Search .................................... 358/509, 471, 358/516; 348/223; 362/226

[56] References Cited

U.S. PATENT DOCUMENTS

| | | | |
|---|---|---|---|
| 4,642,679 | 2/1987 | Nagano | 358/75 |
| 4,670,779 | 6/1987 | Nagano | 358/75 |
| 4,731,661 | 3/1988 | Nagano | 358/75 |
| 5,450,215 | 9/1995 | Iwama | 358/509 |

FOREIGN PATENT DOCUMENTS

| | | |
|---|---|---|
| 0158332A2 | 4/1985 | European Pat. Off. . |
| 257392 | 12/1990 | Japan . |
| 334712 | 5/1991 | Japan . |

*Primary Examiner*—Edward L. Coles
*Assistant Examiner*—Twyler Lamb
*Attorney, Agent, or Firm*—David G. Conlin; William J. Daley, Jr.

[57] ABSTRACT

A compact color image reader for scanning an image in a short time is disclosed. The color image reader includes three fluorescent lamps 17 of red, green, and blue, a lighting circuit 15 for lighting the three fluorescent lamps sequentially, a CCD 183 for reading an image illuminated by the three fluorescent lamps and a control circuit 16 for controlling a lighting period of each of the fluorescent lamps 17 and the reading of the CCD. In order to perform the scanning of a color image in a short time, the lighting circuit 15 lights each of the three fluorescent lamps at a lamp current higher than a rated value and the CCD performs the fast reading in a period corresponding to the lighting period.

8 Claims, 13 Drawing Sheets

COLOR IMAGE READER

BACKGROUND OF THE INVENTION

1. Field of the Invention

The present invention relates to a color image reader, and in particular, to a color scanner or a color facsimile.

2. Description of the Related Art

Conventional light sources for scanners include hot cathode fluorescent lamps each having a filament section at both ends. An advantage of hot cathode fluorescent lamps is their large luminous energy but they are disadvantageous in that they have a large lamp diameter of 100 mmf and a short life of about 5,000 H. Japanese Patent Application Laying Open (KOKAI) No. 2-57392 discloses a lighting circuit for hot cathode fluorescent lamps.

Japanese Patent Application Laying Open (KOKAI) No. 3-34712 discloses a color image reader that allows three light sources to flash sequentially at a high speed and which uses a CCD.

By using three circuits as shown in Japanese Patent Application Laying Open (KOKAI) No. 2-57392, three hot cathode fluorescent lamps can be allowed to light easily.

Small cold cathode fluorescent lamps having diameter of 4 or 3 mint with no filament section at either end have recently been implemented. The sensitivity of CCDs has also recently been improved to enable much faster reading.

Although cold cathode fluorescent lamps are smaller than hot cathode fluorescent lamps and have a longer life (about 10,000 H), they disadvantageously have a smaller luminous energy and requires a high voltage of 1,200 VAC compared to 300 VAC in h hot cathode fluorescent lamps.

Thus, the use of a cold cathode fluorescent lamp enables a small scanner to be implemented but results in a lower reading speed.

SUMMARY OF THE INVENTION

It is therefore an object of the present invention to provide a color image reader that can provide fast scanning and have a small size even if a cold cathode fluorescent lamp is used therein.

According to the present invention, the above object is achieved by a color image reader comprising three fluorescent lamps each for radiating respective one of lights having wavelengths of red, green, and blue, a lighting circuit for lighting the fluorescent lamps with respective lamp currents each having a value higher than a rated current of each of the fluorescent lamps, a CCD for reading an image illuminated by the fluorescent lamps and a control circuit for controlling a lighting period of each of the fluorescent lamps and a reading period of the CCD.

The color image reader increases the luminous energy of each fluorescent lamp to enable fast reading operations.

The control circuit may turn off each of the fluorescent lamps for a predetermined period of time within a lighting period therefore, so as to make the average lamp current equal to or lower than a rated value of the fluorescent lamp, when the three fluorescent lamps are turned on sequentially.

The color image reader enables fast reading operations without increasing the electrode temperature when a single fluorescent lamp is used to read images.

The control circuit may turn off the three fluorescent lamps simultaneously for a predetermined period of time so as to make each of the average lamp currents equal to or lower than respective ones of rated values, when the three fluorescent lamps are turned on simultaneously.

The color image reader enables fast reading operations without increasing the electrode temperature when three fluorescent lamps are allowed to light simultaneously in order to perform reading operations.

Preferably, the predetermined period of time is determined to be longer than a time period $T_{OFF}$ for satisfying the following expression, $$I_R = (I_{ON} \times T_{ON})/(T_{ON} + T_{OFF}),$$

where $T_{ON}$ is a time period for turning on, $I_R$ is a rated current, and $I_{ON}$ is a current from the lighting circuit.

The color image reader enables the easy setting of that ON/OFF period of time of fluorescent lamps which maintains the electrode temperature at the appropriate value or lower.

Preferably, the color image reader further comprises a set of cables for connecting the three fluorescent lamps with the lighting circuit, including three high voltage lighting lines each corresponding respective one of the fluorescent lamps and two GND lines each located between the two high voltage lighting lines.

The color image reader can reduce the effects of the floating capacity between high voltage lighting cables on each fluorescent lamp.

More preferably, the high voltage lighting line located in the middle of the three high voltage lighting lines is connected to o ne of the three fluorescent lamps which has the highest luminous efficacy.

The color image reader can reduce the difference in the electrode temperature among three fluorescent lamps when the floating capacity between high voltage lighting cables affect each fluorescent lamp.

More preferably, the capacity of a high voltage capacitor in the lighting circuit which corresponds to each fluorescent lamp is twice or greater than the floating capacity in the high voltage line connected thereto.

The color image reader can reduce the voltage to be generated in transformers and enables the use of small and inexpensive transformers when the floating capacity between high voltage lighting cables affect each fluorescent lamp.

Further objects and advantages of the present invention will be apparent from the following description of the preferred embodiment of the invention as illustrated in the accompanying drawings.

Figure 1:
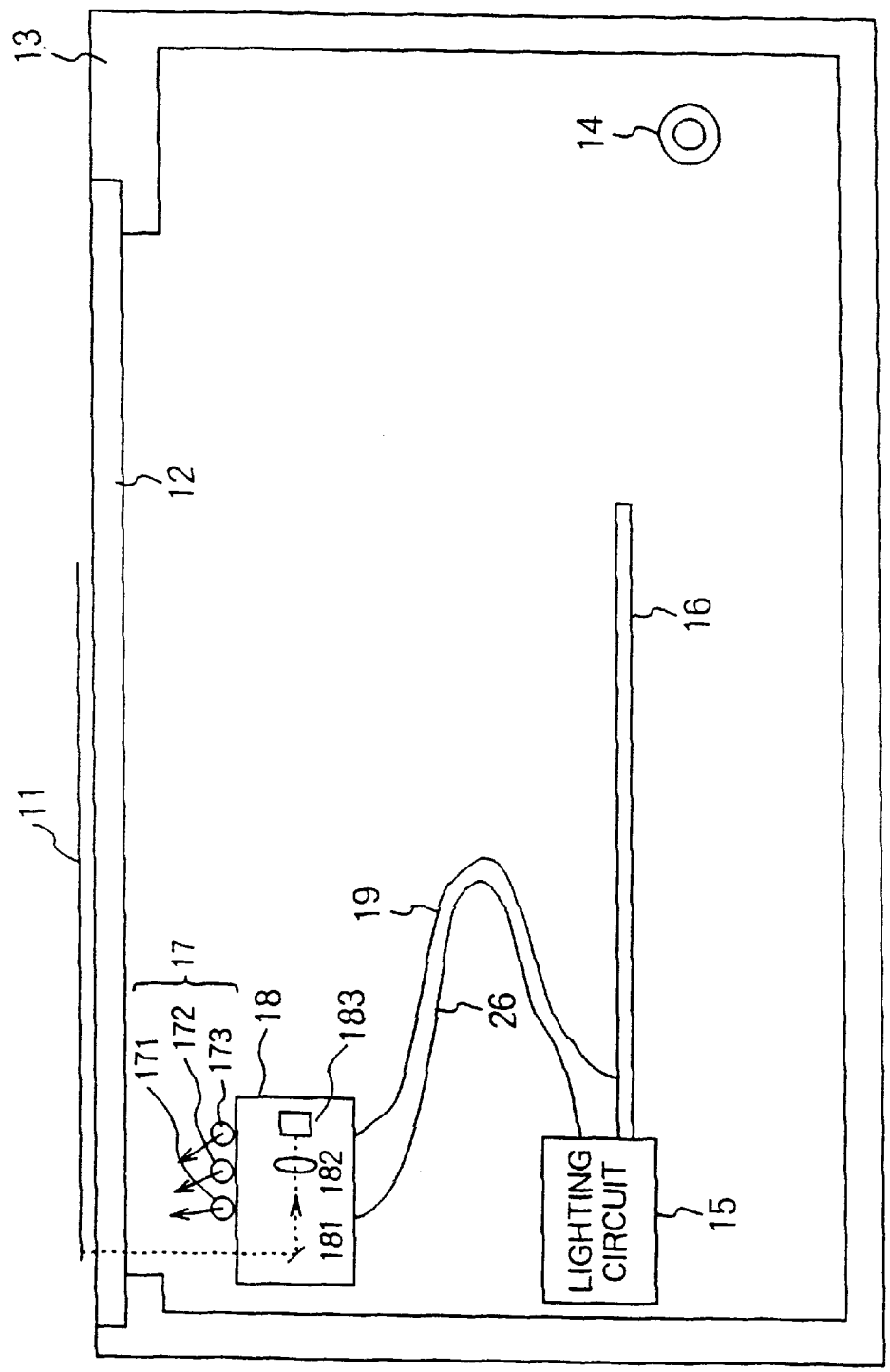
FIG. 1 shows construction of a first embodiment of the color image reader according to the present invention.
Figure 2:
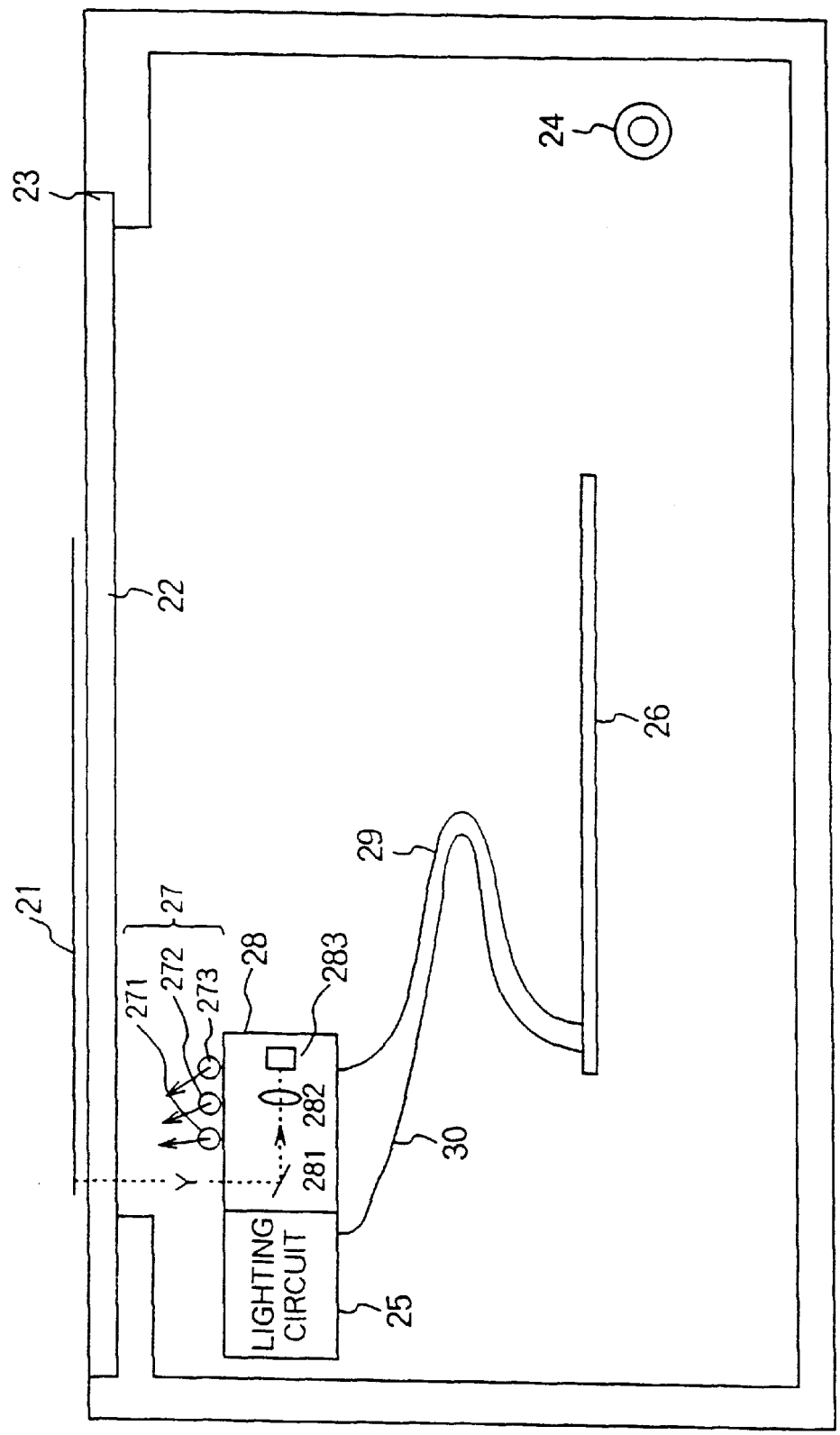
FIG. 2 shows construction of a second embodiment of the color image reader according to the present invention.
Figure 7A:
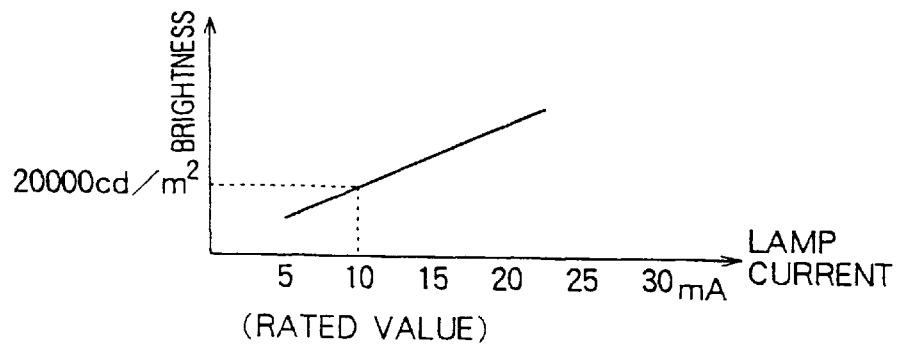
Figure 7B:
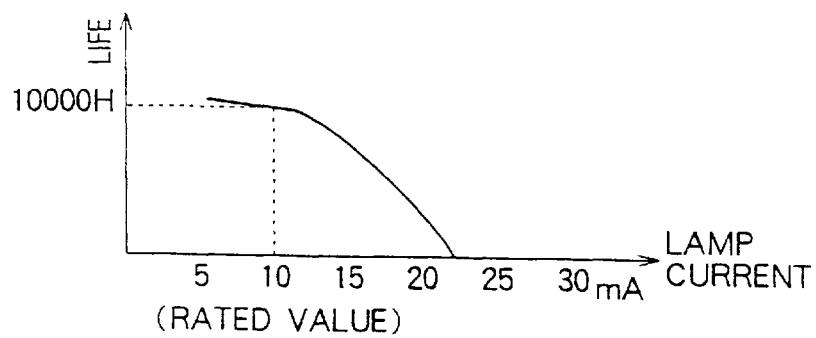
Figure 7C:
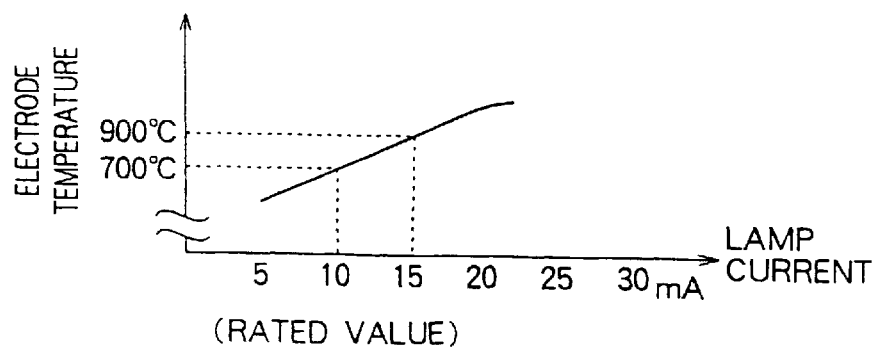
Figure 8:
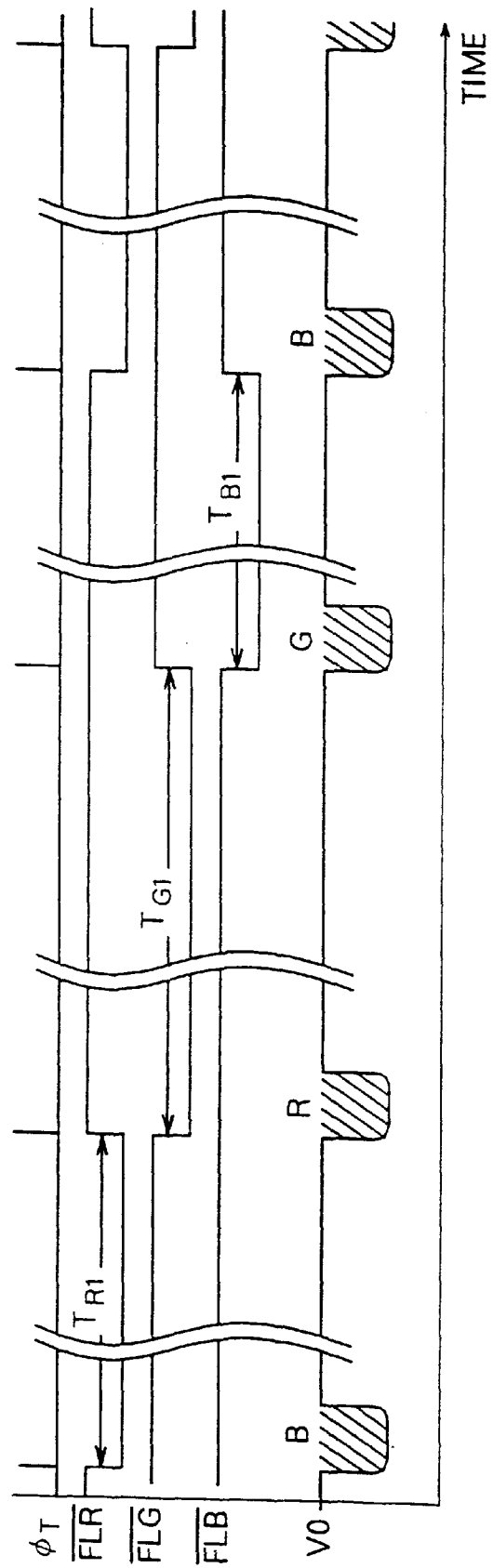
Figure 9A:
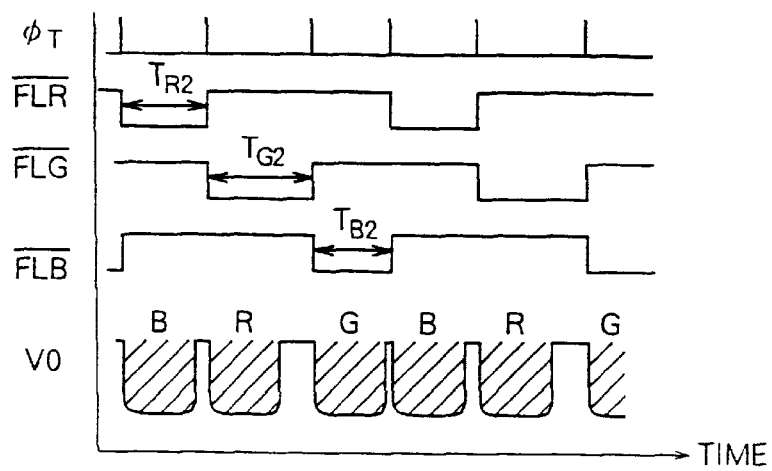
Figure 9B:
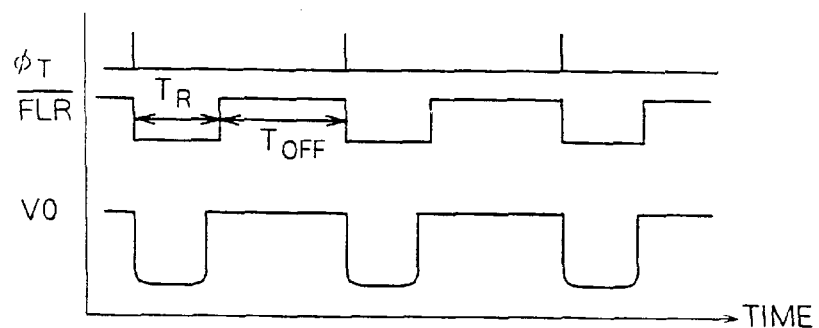
Figure 9C:
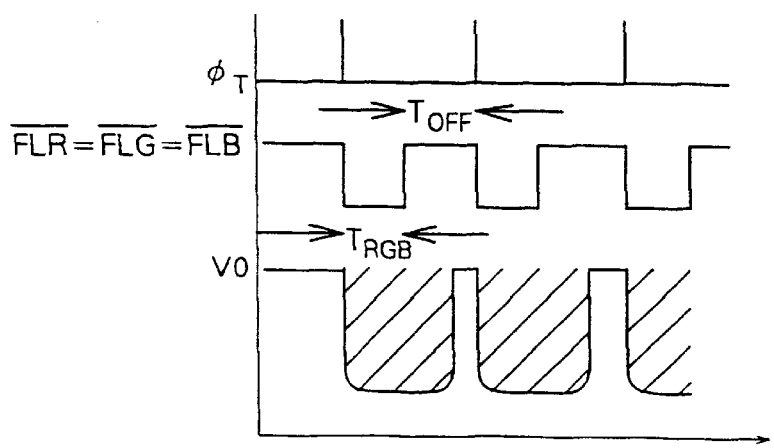
Figure 10:
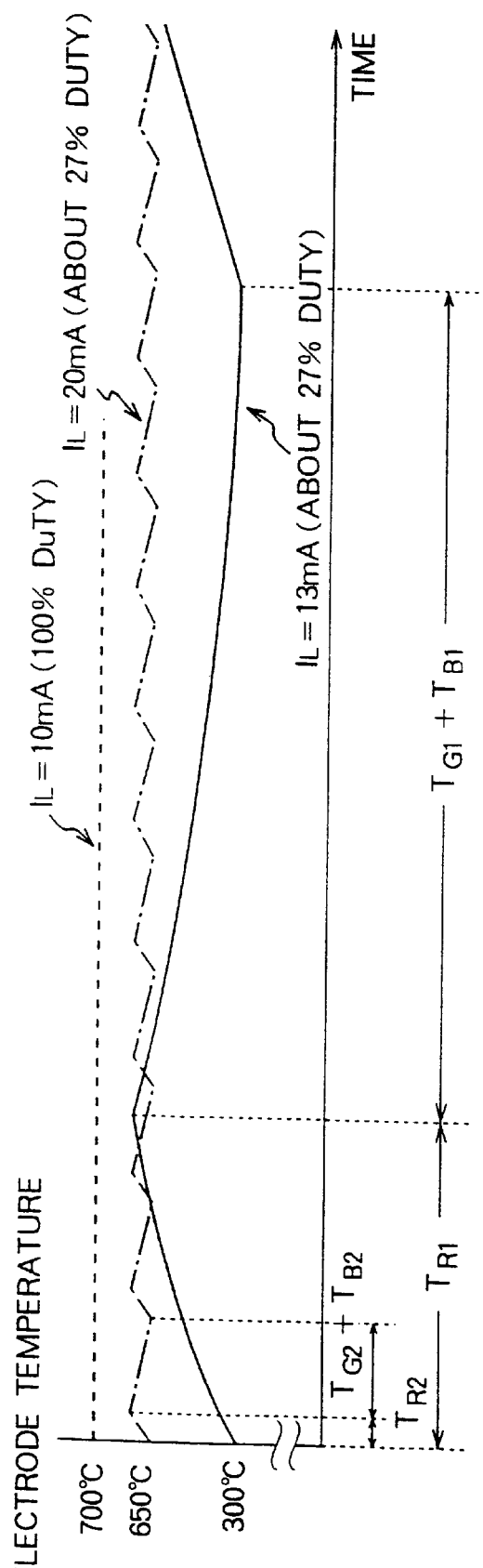
Figure 11:
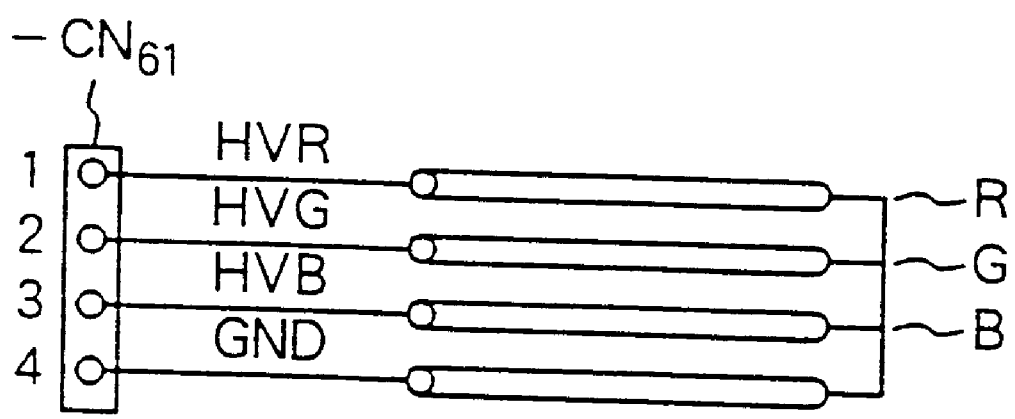
Figure 12:
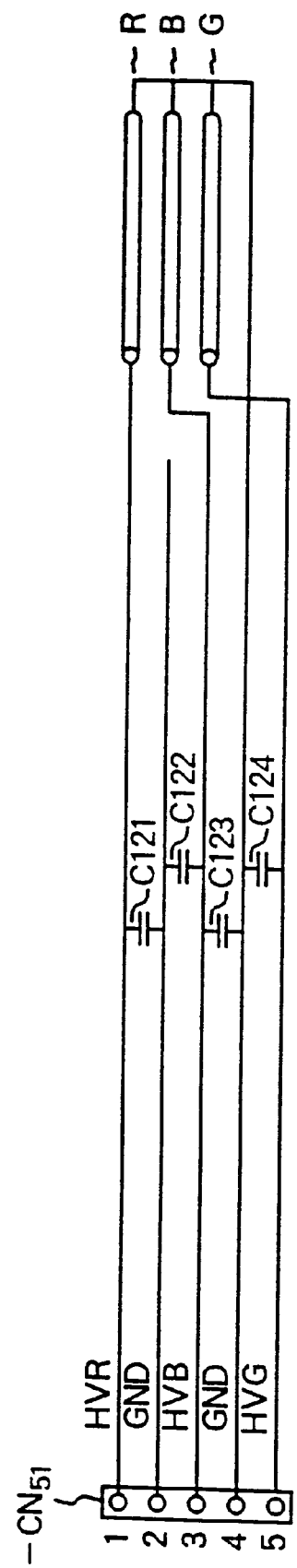
Figure 13:
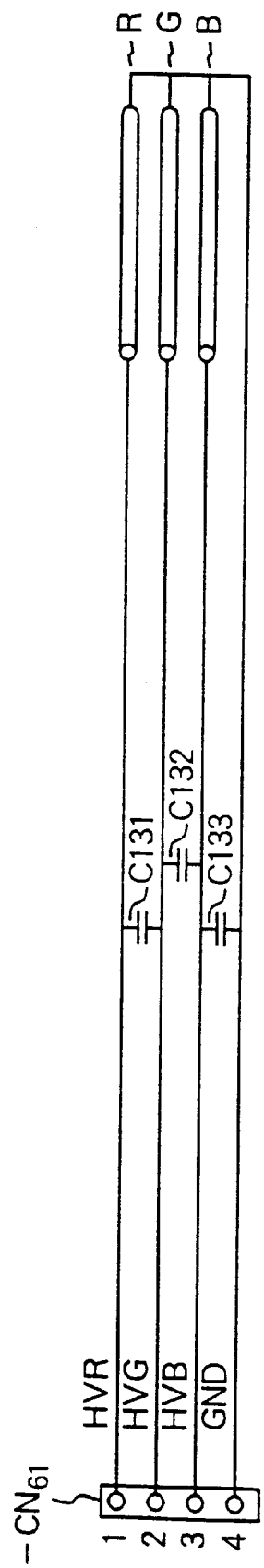
Figure 14:
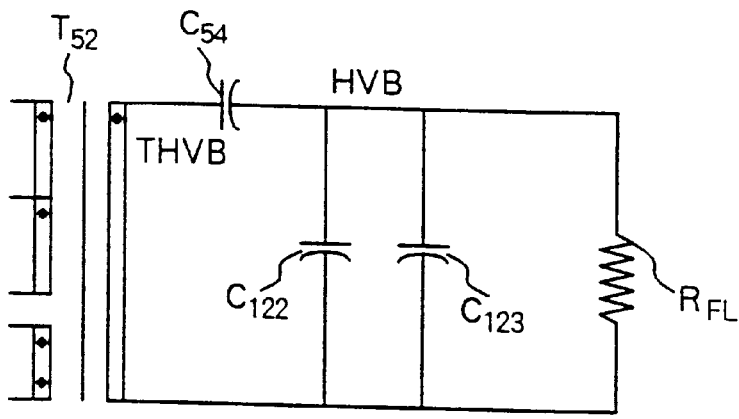
Figure 15:
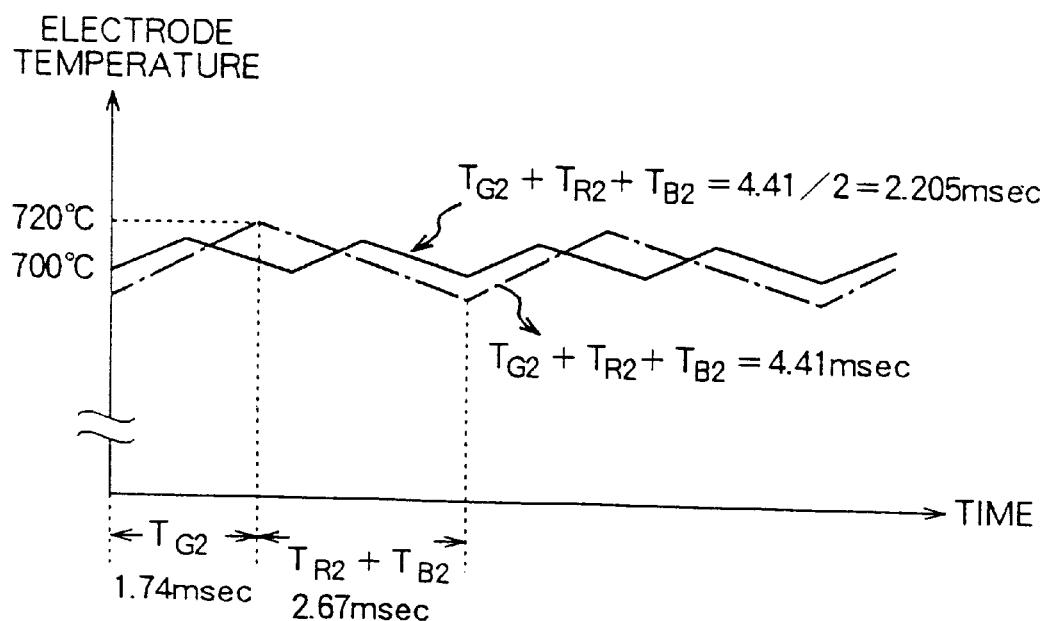

each of FIGS. 7a to 7c is a graph showing changes in each parameter relative to changes in the lamp current of a cold cathode fluorescent lamp rated at 10 mA;

FIG. 8 is a timing chart showing the relationship between a lighting period and a CCD output in a conventional CCD when three light sources are allowed to light sequentially;

each of FIGS. 9a to 9c is a timing chart showing the relationship between a lighting period and a CCD output when a high-sensitivity CCD is used and when the lamp current is set at 20 mA;

FIG. 10 is a graph showing the relationship between the lamp current and the electrode temperature;

FIG. 11 shows lighting cables used for the reader in FIG. 2;

FIG. 12 shows lighting cables used for the reader in FIG. 1;

FIG. 13 shows the case in which the floating capacity of lighting cables poses a problem;

FIG. 14 schematically shows the output section of a transformer in the lighting circuit; and FIG. 15 is a graph showing the relationship between the lighting period and the electrode temperature.

DESCRIPTION OF THE PREFERRED EMBODIMENT

Next, the embodiment of the present invention will be described by referring to the drawings.

FIG. 1 shows construction of a first embodiment of the color image reader according to this invention.

This reader includes a glass 12 that is disposed on the top surface of a cabinet 13 and on which a manuscript 11 is placed. In this reader, the manuscript 11 reflects light from a light source 17 comprising three light sources 171, 172, and 173 radiating respective lights of red, green, and blue wavelengths, which correspond to the primary colors of light, and the light is converted into electric signals by an optical unit 18 comprising a mirror 181, a lens 182, and a CCD 183. The lighting of the light source 17 is controlled by a lighting circuit 15, the light source 17 and the optical unit 18 are moved by a motor 14 so as to scan the manuscript, and the lighting circuit 15 and the CCD 183 are connected to a control circuit 16 via a CCD signal cable 19 and a lighting cable 20, respectively.

FIG. 2 shows construction of a second embodiment of the color image reader according to this invention.

The construction shown in FIG. 2 has almost the same components as the device in FIG. 1 except that a lighting circuit 25 can be moved with an optical unit 28. This constitution is generally larger than that shown in FIG. 1.

Figure 3:
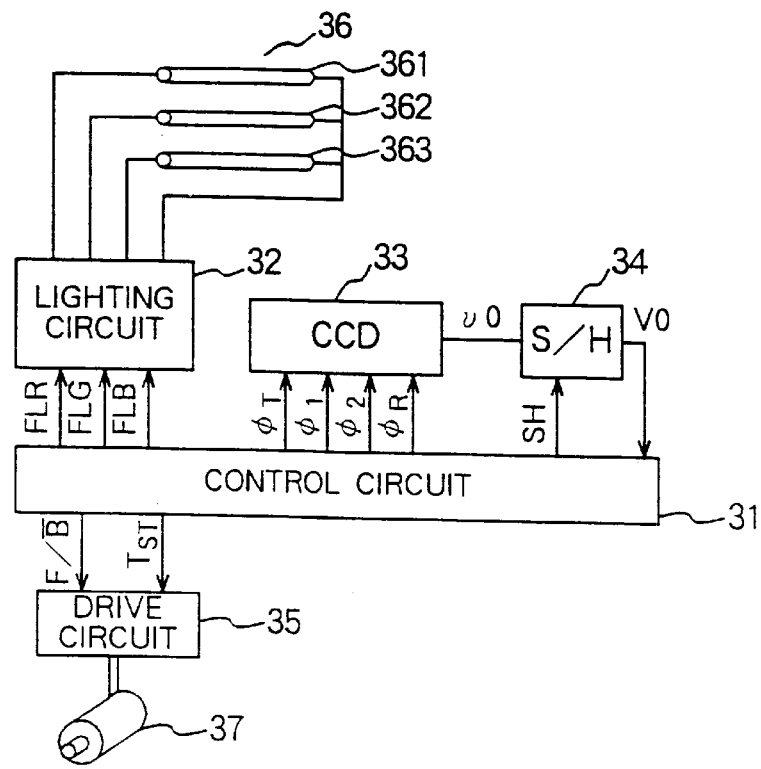
FIG. 3 is a block diagram of a circuit used for the readers in FIGS. 1 and 2.

FIG. 3 is a block diagram of a circuit used in the readers in FIGS. 1 and 2.

A control circuit 31 transmits the following lighting signals which are operative when having a value of "0" to allow the lighting of a red light source 361, a green light source 362, and a blue light source 363 which a cold cathode fluorescent lamp.

$\overline{FLR}, \overline{FLG}, \overline{FLB}$

The control circuit transmits clocks $\emptyset_T$, $\emptyset_1$, $\emptyset_2$, and $\emptyset_R$ to a CCD image sensor 33 for scanning the manuscript, and the output v0 of the CCD is sent to a sample and hold circuit 34, in which it is sampled and held by the sampling and holding signal SH, and then transmitted to the control circuit 31 as output V0.

Furthermore, the control circuit 31 transmits to a motor drive circuit 35 the following signal for showing a moving direction represented by $F\sqrt{B}$ and a pulse signal $T_{ST}$. When the signal has a value of "1", the motor drive circuit 35 advances the optical unit one step on receiving a single pulse $T_{ST}$, whereas when the signal has a value of "0", it allows the optical unit to retreat one step on receiving a single pulse $T_{ST}$.

Figure 4:
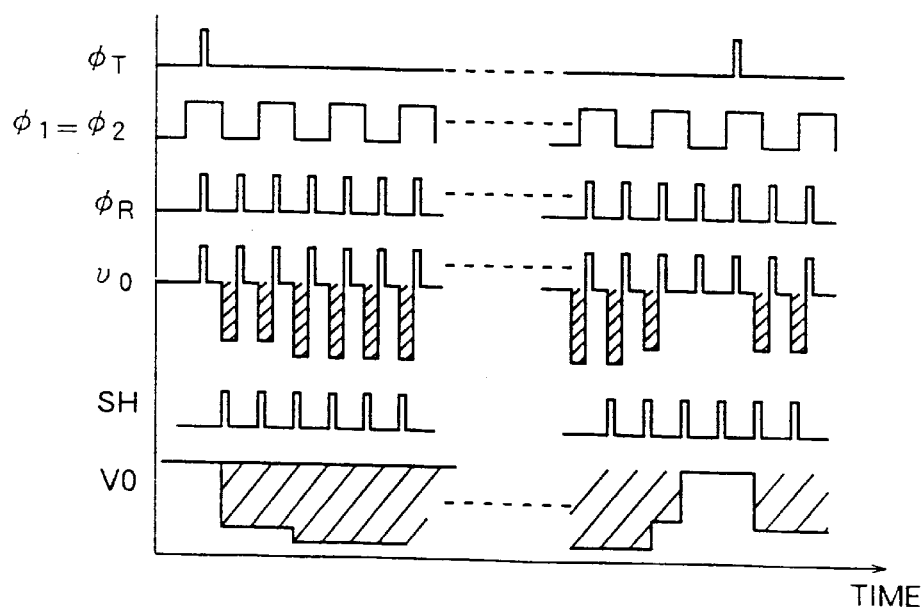
FIG. 4 is a timing chart showing the relationship between clock signals from a control circuit and an output signal from a CCD.

FIG. 4 is a timing chart showing the relationship between the four clocks $\emptyset_T$, $\emptyset_1$, $\emptyset_2$, and $\emptyset_R$ transmitted from the control circuit 31 to the CCD 35 and the output of the CCD v0 and a sample hold signal SH and the signal V0 obtained after the sample and hold operation.

Figure 5:
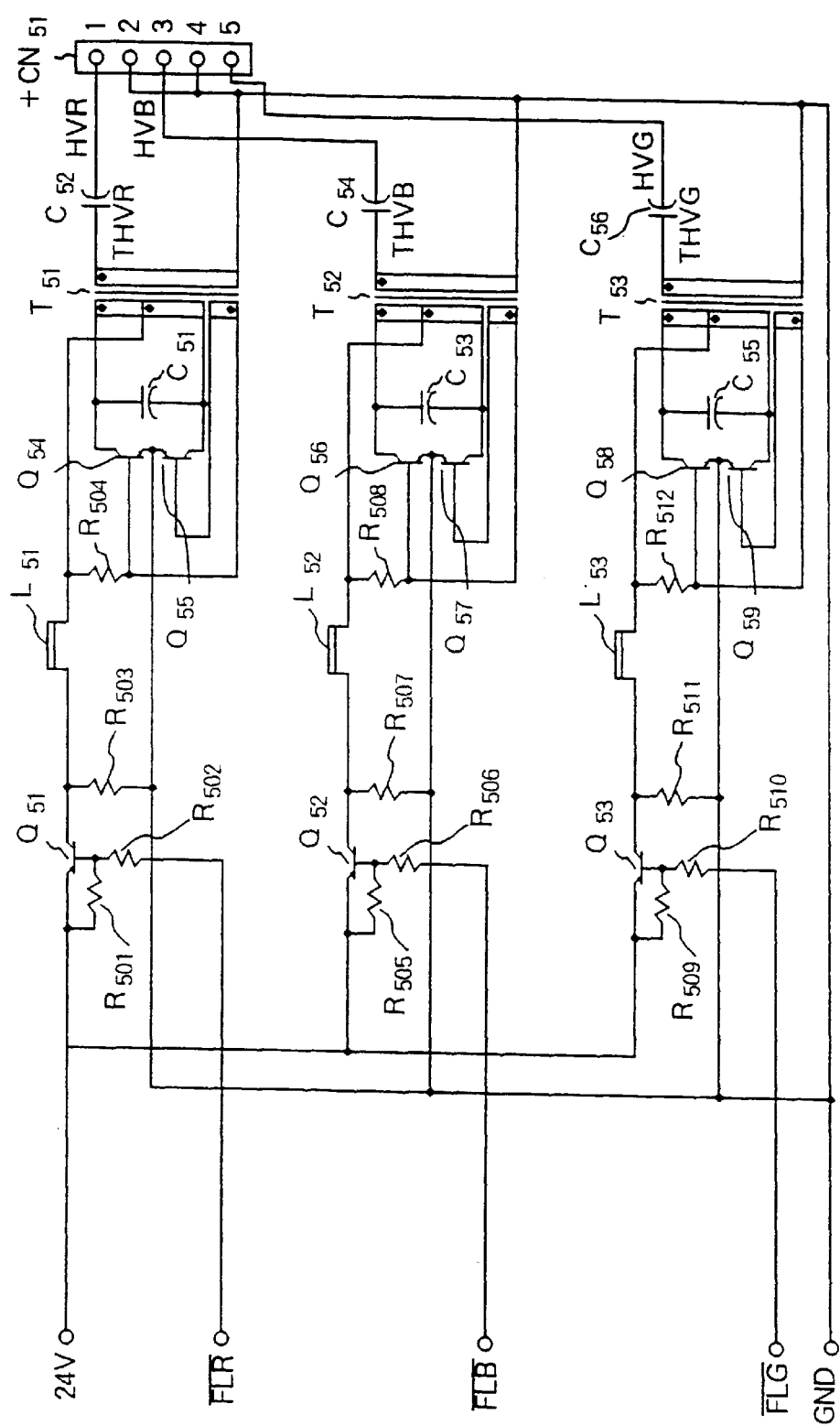
FIG. 5 is a circuit diagram showing a first specific example of a lighting circuit.
Figure 6:
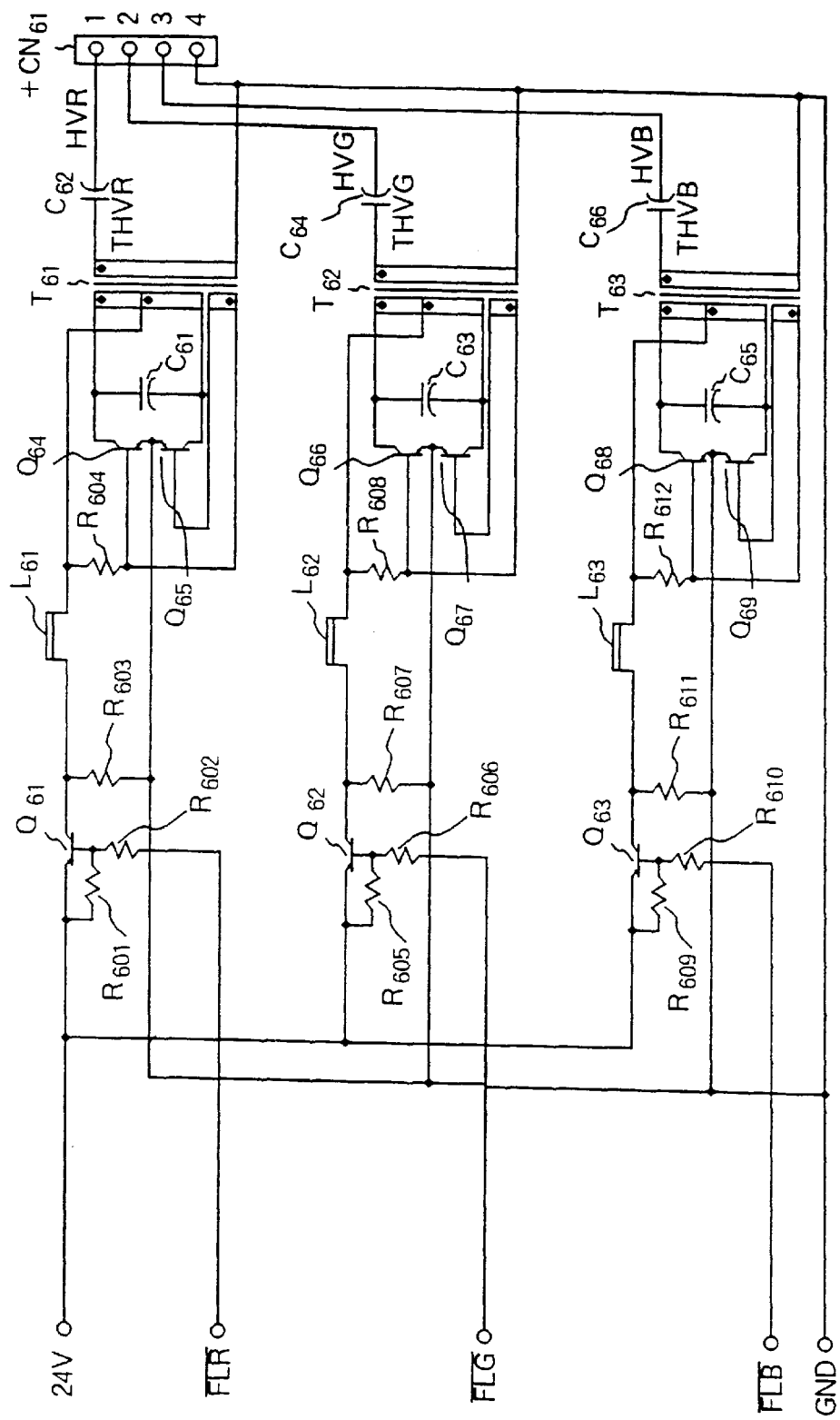
FIG. 6 is a circuit diagram showing a second specific example of a lighting circuit.

FIGS. 5 and 6 are circuit diagrams showing specific examples of lighting circuits. In each of the figures, high voltage transformers $T_{51}$, $T_{52}$, $T_{53}$, $T_{61}$, $T_{62}$, and $T_{63}$ self-oscillate at about 40 kHz. An output connector $+CN_{51}$ in the lighting circuit in FIG. 5 is connected to a connector $-CN_{51}$ in FIG. 12, and an output connector $+CN_{61}$ in the lighting circuit in FIG. 6 is connected to a connector $-CN_{61}$ in FIG. 11. In FIG. 12, $C_{121}$ to $C_{124}$ each indicate the floating capacity between the lines. FIG. 13 shows the case in which the extension of the lighting cables in FIG. 11 increases the floating capacities $C_{131}$ to $C_{133}$ between the lines. This causes a problem.

Due to the relationship between the length of the lighting cable and the floating capacity, the lighting circuit in FIG. 5 and the connectors in FIG. 12 are preferably used in the embodiment shown in FIG. 1, and the lighting circuit in FIG. 6 and the connectors in FIG. 11 are preferably used in the embodiment shown in FIG. 2.

The operation of the color image reader is described with reference to the drawings.

Each of FIGS. 7a to 7c is a graph showing changes in each parameter relative to changes in the lamp current of a cold cathode fluorescent lamp rated at 10 mA. FIG. 7a shows the relationship between the lamp current and the brightness of the light source, FIG. 7b shows the relationship between the lamp current and the life of the lamp, and FIG. 7c shows the relationship between the lamp current and the temperature of the electrode section.

The cold cathode fluorescent lamp shown in FIG. 7c has a rated current of 10 mA, and is allowed to light at 10 mA and 100% DUTY. The temperature of the electrode is 700° C. in its stable conditions, and significantly increases with increasing lamp current, thereby rapidly reducing the life of the lamp.

However, the cold cathode fluorescent lamp is used at a rated current, the luminous energy obtained is small and the color reading speed is low. To eliminate this advantage, the color image reader according to this invention allows the three light sources to light sequentially and uses each light source at a lamp current of the rated value or higher.

FIG. 8 is a timing chart showing the relationship between the lighting signal and the CCD output when a conventional low-sensitivity CCD was used and when the three light sources were allowed to light sequentially. In this case, the rated current of the cold cathode light source was 10 mA, but the lamp current was set at 13 mA. If the three light sources are allowed to light sequentially and the CCD is used for color reading as described above, DUTY lighting can be achieved to allow a current of the rated value or higher to flow.

Each of FIGS. 9a to 9c shows a timing chart showing the relationship between the lighting signal and the CCD output when a high-sensitivity CCD was used and when the lamp current was set at 20 mA. FIG. 9a shows the relationship between the lighting signals for the three light sources and V0, and FIG. 9b shows the relationship between the lighting signal and V0 when only the R light source was allowed to light. The latter case has a period of time $T_{OFF}$ during which lighting is turned off to maintain the temperature of the electrodes at an appropriate temperature or lower in order to ensure a longer life of the lamps.

FIG. 9c shows the relationship between the lighting signal and V0 when the three light sources (R, G, and B) were allowed to light simultaneously and when the lamp current was set at 20 mA. In this case also, the period of time $T_{OFF}$ is provided for turning off lighting.

FIG. 10 is a graph showing the relationship between the lamp current and the electrode temperature. The three lines in this figure indicate the case in which the lamp current $I_L$ was maintained at 10 mA and in which the lamps were allowed to light constantly (100% DUTY), the case in which the lamp current $I_L$ was maintained at 13 mA and in which the ON period of time $T_{R1}$ lasted 15 msec. while the OFF period time $T_{G1}+T_{B1}$ lasted about 40 msec so that the light sources were turned on and off at 27% DUTY, and the case in which the lamp current $I_L$ was 20 mA and in which the light sources were turned on and off at 27% DUTY.

As is apparent from the graph, when $I_L$=10 mA and the lamps were allowed to light constantly, the electrode temperature was 700° C., whereas when $I_L$=13 mA and the light sources were turned on and off at 27% DUTY, the peak of the electrode temperature was about 650° C., which is lower than the appropriate temperature of 700° C.

It will be understood that when DUTY lighting is carried out, there is no problem even if the current applied while the lamps are turned on is lower than the rated value. That is, flashing at $I_L$=13 mA improves the reading speed compared to flashing at $I_L$=10 mA. Since 10/13 is about 0.77, the reading time can be reduced to about 77%.

This relationship can be described as follows using equations.

In FIGS. 8 and 10, if $I_L$=13 mA and it is assumed that $T_{R1}$=15 msec., $T_{G1}$=18.75 msec., and $T_{B1}$=13.75 msec., then $T_{R1}+T_{G1}+T_{B1}$=47.5 msec.

If $I_L$=10 mA and it is assumed that $T_{R1}$=19.5 msec., $T_{G1}$=24.38 msec., and $T_{B1}$=17.88 msec., then $T_{R1}+T_{G1}+T_{B1}$=61.76 msec.

The reading time ratio is 47.5/61.76=about 0.77.

The above relationship can also be estimated easily from the fact that the integral time of the image sensor ($T_{R1}$, $T_{G1}$, $T_{B1}$) is inversely proportional to each lamp current due to the linear relationship between the brightness of the fluorescent lamp and the lamp current shown in FIG. 7a.

In addition, since recent CCD are very sensitive, the case will be discussed in which such a high-sensitivity CCD is used and in which fluorescent lamps are allowed to light at 20 mA, which is double the rated value, and at 27% DUTY.

In this case, $T_{R2}$ shown in FIG. 10 is about one-seventh of $T_{R1}$ obtained when a low-sensitivity CCD is used and when lamps are allowed to light at $I_L$=13 mA because the sensitivity of the new CCD is seven times as large as that of the low-sensitivity CCD. The lamp current increases from 13 mA to 20 mA. Thus, compared to 15 msec. in the old CCD, the reading time is reduced to 15 msec.×(1/7)×(13/20)=about 1.4 msec.

It is well known that the output of the CCD is proportional to the brightness of light received by the CCD as well as the integral time (between $\varnothing_T$ and $\varnothing_T$). Thus, if a specified value of CCD output is expected, the integral time is inversely proportional to the sensitivity of the CCD and the strength of light received by the CCD.

FIG. 10 also indicates that the peak of the electrode temperature is maintained at the appropriate value or lower when the fluorescent lamps are turned on and off at a short interval even if the ON DUTY remains the same and even if a large amount of lamp current is allowed to flow.

This is because when the fluorescent lamps are turned on and off at a short interval, the average temperature of the electrode increases and becomes higher than the ambient temperature to provide good heat radiation.

The scanning time can be reduced by increasing the sensitivity of the CCD in this manner, but this invention can further reduce the scanning time for color reading by significantly increasing the lamp current relative to the rated value.

The method for allowing the sequential flashing of the three fluorescent lamps corresponding to the primary colors has been described. If, however, a single color light is used but the $T_{OFF}$ period of time is not provided as shown in FIG. 9b, the fluorescent lamps are allowed to light at a lamp current of 20 mA and at 100% DUTY to significantly increase the temperature of the electrode section, thereby substantially reducing their life. Consequently, the provision of the $T_{OFF}$ period of time serves to maintain the average lamp current at the rated value or lower to ensure a longer life of the lamps.

If the three fluorescent lamps are allowed to light simultaneously for scanning, the provision of the $T_{OFF}$ period of time ensures a longer life of the lamps as in the single primary color.

If a single color light is used or three color lights are simultaneously radiated as described above, the OFF period of time $T_{OFF}$ during which the average lamp current is maintained at the rated value can be determined by the following equation if the ON period of time of the fluorescent lamps is referred to as $T_{ON}$.

The rated current of the fluorescent lamp=(the lamp current in ON period×$T_{ON}$)/($T_{ON}+T_{OFF}$).

Thus, $T_{OFF}$ must only be larger than its value that meets the above equation.

If the lamp currents of the three fluorescent lamps have the same value and $T_{R2}$=1.4 msec., $T_{G2}$=1.74 msec., and $T_{B2}$=1.27 msec. in FIG. 9a, the temperature of the electrode of the G fluorescent lamp is the highest among the three fluorescent lamps R, G and B because its ON time=1.74 msec. is the longest while its OFF time=$T_{R2}+T_{B2}$=2.67 msec. is the shortest.

The upper limit of the lamp current of the G lamp is then determined.

If in FIG. 15, $T_{R2}$=1.4 msec., $T_{G2}$=1.74 msec., and $T_{B2}$=1.27 msec. as in FIGS. 9a to 9c, the maximum temperature of the electrode is 720° C., which is close to the appropriate temperature of 700° C. Thus, this construction does not affect the life of the fluorescent lamp.

FIG. 15 also includes a graph indicating the case in which $T_{R2}$=1.4 msec./2, $T_{G2}$=1.74 msec./2, and $T_{B2}$=1.27 msec./2. In this case, both the maximum and the minimum temperatures of the electrode are about 700° C., so the life of the fluorescent lamp is not affected.

Furthermore, if $T_{R2}$=1.4 msec./5, $T_{G2}$=1.74 msec./5, and $T_{B2}$=1.27 msec./5, the temperature of the electrode is maintained at a constant value of about 700° C.

FIGS. 7b and 7c indicate that the life of the fluorescent lamp is not affected until the temperature of the electrode increases from the appropriate value of 700° C. to reach 750° C.

Consequently, when the period of time $(T_{R2}+T_{G2}+T_{B2})$ is short, turning the lamp current on and off is equivalent to the application of the average current at 100% DUTY (direct currents).

That is, when the period of time $(T_{R2}+T_{G2}+T_{B2})$ is short, the rated current of the fluorescent lamp≧the average current=(the lamp current of the fluorescent lamp×$T_{OFF}$)/$(T_{ON}+T_{OFF})$. The life of the fluorescent lamp is not affected if the average current or the rated current of the lamp or lower is used.

Although the embodiments of this invention has been described, this aspect is applicable to not only cold cathode fluorescent lamps but also hot cathode fluorescent lamps.

Wiring cables for the lighting circuit is discussed below.

If in a scanner using a cold cathode fluorescent lamp, the lighting circuit 25 is disposed near the fluorescent lamps as shown in FIG. 2, high voltage lighting cables HVR, HVG, and HVB (to each of which about 1,000 V is applied) shown in FIG. 6 are not adversely affected by the floating capacity due to the small wiring length as shown in FIG. 11. The floating capacity, however, adversely affects the lighting cables if the lighting circuit 15 shown in FIG. 1 is moved from the neighborhood of the light sources and located near the control circuit 16 and if the length of the wiring in FIG. 11 is increased so as to connect the cables to the cold cathode fluorescent lamps as in FIG. 13, the floating capacity adversely affects the lighting cables.

When, for example, a high voltage HVR is applied, due to the high frequency of the HVR (about 40 kHz), the floating capacity C131 causes not only the R cold cathode fluorescent lamp but also the G cold cathode fluorescent lamp to light faintly, resulting in the mixture of colors during color reading.

Thus, according to the embodiments of this invention, when the wiring length becomes longer, the interference among the high voltage lighting cables and thus the mixture of colors can be prevented by arranging the wiring in the order of a high voltage lighting cable, a GND cable, a high voltage lighting cable, and a GND high voltage lighting cable as in the lighting circuit shown in FIG. 5 and the cables shown in FIG. 12.

In FIG. 12, only the floating capacity $C_{121}$, or $C_{124}$ is connected to the high voltage lighting cable at either end, whereas a combined capacity $C_{122}+C_{123}$ is connected to the high voltage lighting cable in the middle as the floating capacity. In this case, the effective current to the middle cold cathode fluorescent lamp is smaller than that to the fluorescent lamp at either end, while the middle cold cathode fluorescent lamp has a larger reactive current to the floating capacity than the fluorescent lamp at either end. This causes the middle fluorescent lamp to be darker than the fluorescent lamp at either end under the same conditions.

Thus, according to the embodiments of this invention, the cable from the B cold cathode fluorescent lamp that is the lightest among the R, G, and B cold cathode fluorescent lamps is preferably located in the middle in order to balance the R, G, and B light DUTY. If, for example, in FIG. 9a, the cable to the darkest G fluorescent lamp is located in the middle, $T_{R2}$=1.5 msec., $T_{G2}$=2.7 msec., and $T_{B2}$=1 msec. and the ON DUTY of the G light source is about 52%, thereby disadvantageously increasing the temperature of the G light source to reduce the life of only the G light source.

If these cables are arranged as described above, then $T_{R2}$=1.5 msec., $T_{B2}$=1.5 msec., and $T_{G2}$=1.8 msec. to significantly increase the ON DUTY of the G light source up to 38%.

In FIGS. 5 and 12, the lighting circuit for the B cold cathode fluorescent lamp can be represented by the equivalent circuit in FIG. 14. Allowing the lighting of the B cold cathode fluorescent lamp, which is shown by the resistant load $R_{FL}$ in FIG. 14, requires a high voltage expressed by the following equation:

$$HVB=C_{54}/(C_{54}+C_{122}+C_{123})\times THV_B$$

Since 1,000 V of HVB is required at minimum, about 2,000 V of $THV_B$ is required if $C_{54}$ is 33 PF and $C_{122}+C_{123}$ is about 30 PF. The transformer $T_{52}$ must thus produce a very high voltage and be large and expensive to provide voltage proof. Consequently, according to this invention, $C_4$=68 PF is used to reduce the required amount of the $THV_B$ down to 1,500 V or lower in order to enable the use of small and inexpensive transformers.

If in the embodiment shown in FIG. 2, the circuit in FIG. 6 and the cables shown in FIG. 11 are used to reduce the wiring length, the flowing capacity is negligible, so there will be no problem if $C_{62}$, $C_{64}$, and $C_{66}$, in FIG. 6 are 20 PF or lower.

Many widely different embodiments of the present invention may be constructed without departing from the spirit and scope of the present invention. It should be understood that the present invention is not limited to the specific embodiment described in the specification, except as defined in the appended claims.

What is claimed is:

1. A color image reader comprising:
   three fluorescent lamps each for radiating respective one of lights having wavelengths of red, green and blue;
   a lighting circuit for lighting said fluorescent lamps with respective lamp currents each having a value higher than a rated current of each of said fluorescent lamps;
   a CCD for reading an image illuminated by said fluorescent lamps;
   a control circuit for controlling a lighting period of each of said fluorescent lamps and a reading period of said CCD; and
   wherein said reading period of said CCD is reduced in accordance with a ratio of the rated current to the lamp current.

2. A color image reader according to claim 1, wherein said control circuit turns off each of said fluorescent lamps for a predetermined period of time within a lighting period therefore, so as to make the average lamp current equal to or lower than a rated value of the fluorescent lamp, when said three fluorescent lamps are turned on sequentially.

3. A color image reader according to claim 1, wherein said control circuit turns off said three fluorescent lamps simultaneously for a predetermined period of time so as to make each of the average lamp currents equal to or lower than respective ones of rated values, when said three fluorescent lamps are turned on simultaneously.

4. A color image reader according to claim 1, wherein said reader further comprises a set of cables for connecting said three fluorescent lamps with said lighting circuit, including three high voltage lighting lines each corresponding respective one of said fluorescent lamps and two GND lines each located between the two high voltage lighting lines.

5. A color image reader according to claim 2, wherein said predetermined period of time is determined to be longer than a time period $T_{OFF}$ for satisfying the following expression, $$I_R=(I_{ON}\times T_{ON})/(T_{ON}+T_{OFF}),$$

where $T_{ON}$ is a time period for turning on, $I_R$ is a rated current, and $I_{ON}$ is a current from said lighting circuit.

6. A color image reader according to claim 3, wherein said predetermined period of time is determined to be longer than a time period $T_{OFF}$ for satisfying the following expression, $$I_R=(I_{ON} \times T_{ON})/(T_{ON}+T_{OFF}),$$

where $T_{ON}$ is a time period for turning on, $I_R$ is a rated current, and $I_{ON}$ is a current from said lighting circuit.

7. A color image reader according to claim 4, wherein the high voltage lighting line located in the middle of said three high voltage lighting lines is connected to one of said three fluorescent lamps which has the highest luminous efficacy.

8. A color image reader according to claim 4, wherein the capacity of a high voltage capacitor in said lighting circuit which corresponds to each fluorescent lamp is twice or greater than the floating capacity in the high voltage line connected thereto.

* * * * *